(12) United States Patent
Doh

(10) Patent No.: US 7,393,889 B2
(45) Date of Patent: Jul. 1, 2008

(54) METHOD OF PREPARING RUBBER MODIFIED POLYSTYRENE RESIN COMPOSITION WITH HIGH GLOSS AND IMPACT RESISTANCE

(75) Inventor: Jae Goo Doh, Gyeonggi-Do (KR)

(73) Assignee: Cheil Industries Inc., Kyungsangbuk-do (KR)

( * ) Notice: Subject to any disclaimer, the term of this patent is extended or adjusted under 35 U.S.C. 154(b) by 0 days.

(21) Appl. No.: 10/493,705

(22) PCT Filed: Dec. 27, 2001

(86) PCT No.: PCT/KR01/02272

§ 371 (c)(1),
(2), (4) Date: Apr. 17, 2004

(87) PCT Pub. No.: WO03/033559

PCT Pub. Date: Apr. 24, 2003

(65) Prior Publication Data

US 2004/0254284 A1    Dec. 16, 2004

(30) Foreign Application Priority Data

Oct. 19, 2001    (KR) ................. 2001-64739

(51) Int. Cl.
```
C08F 279/02    (2006.01)
C08J 3/00      (2006.01)
C08K 3/34      (2006.01)
C08K 9/04      (2006.01)
C08L 47/00     (2006.01)
```
(52) U.S. Cl. ............... 524/445; 524/447; 524/511; 524/515; 524/528; 524/529; 525/95; 525/98; 525/99; 525/243

(58) Field of Classification Search ............ 524/445, 524/447, 511, 515, 529, 528; 525/95, 98, 525/99, 243
See application file for complete search history.

(56) References Cited

U.S. PATENT DOCUMENTS

| | | | | |
|---|---|---|---|---|
| 2,694,692 A * | 11/1954 | McIntire et al. | ............. | 525/300 |
| 3,844,978 A * | 10/1974 | Hickson | ............. | 502/66 |
| 4,146,589 A | 3/1979 | Dupre | | |
| 4,695,402 A * | 9/1987 | Finlayson et al. | ............. | 516/101 |
| 4,839,418 A | 6/1989 | Schwaben et al. | | |
| 5,334,658 A * | 8/1994 | Blumenstein et al. | ......... | 525/71 |
| 5,780,376 A * | 7/1998 | Gonzales et al. | ............. | 501/146 |
| 6,143,833 A | 11/2000 | Klusmann et al. | | |
| 6,252,020 B1 * | 6/2001 | Kuo et al. | ............. | 526/128 |

FOREIGN PATENT DOCUMENTS

| | | |
|---|---|---|
| EP | 0 337 569 A1 | 10/1989 |
| JP | 2-185509 | 7/1990 |
| JP | 3-162407 | 6/1991 |
| JP | 4-100810 | 4/1992 |
| JP | 8-92329 | 4/1996 |
| JP | 1-261444 | 10/1999 |
| KR | 1995-8602 B1 | 11/1998 |
| WO | WO 00/06623 | 8/2000 |

OTHER PUBLICATIONS

Abstract of WO 00/06623 published Aug. 9, 2000.
Abstract of JP 1-261444 published Oct. 18, 1989.
Abstract of JP 2-185509 published Jul. 18, 1990.
Abstract of JP 3-162407 published May 6, 1991.
Abstract of JP 4-100810 published Apr. 2, 1992.
Abstract of JP 8-92329 published Apr. 9, 1996.
Abstract of KR 1995-8602 published Nov. 26, 1998.

* cited by examiner

Primary Examiner—Patrick Niland
(74) Attorney, Agent, or Firm—Maria Parrish Tungol

(57) ABSTRACT

The rubber modified polystyrene resin composition with high gloss and impact resistance according to the present invention is prepared by (i) polymerizing a solution consisting of about 80 to 95% by weight of styrene (A) and about 5 to 20% by weight of polybutadiene rubber (B) with a clay material at a temperature of about 90 to 150° C. in a first reactor so as to disperse at least two different sizes of polybutadiene rubber particles in the matrix of polystyrene, and (ii) inputting the resulting solution of the step (i) to a second reactor being kept at about 130 to 180° C. to terminate the polymerization.

24 Claims, No Drawings

METHOD OF PREPARING RUBBER MODIFIED POLYSTYRENE RESIN COMPOSITION WITH HIGH GLOSS AND IMPACT RESISTANCE

FIELD OF THE INVENTION

The present invention relates to a rubber modified polystyrene resin composition with high gloss and impact resistance. More particularly, the present invention relates to a rubber modified polystyrene resin composition with high gloss and impact resistance, which is prepared by polymerizing styrene, polybutadiene rubber and a clay material so as to disperse at least two different sizes of polybutadiene rubber particles in the matrix of polystyrene.

BACKGROUND OF THE INVENTION

High impact polystyrene (HIPS) resins are conventionally prepared by heat-polymerizing a styrene-polybutadiene rubber solution at a high temperature of about 100 to 150° C. or graft-polymerizing using an initiator. Such rubber modified HIPS is a phase that rubber particles are dispersed in the matrix of polystyrene, the rubber particles having the sizes of about 1.5 to 6.0 μm. When an external impact is applied to the HIPS resin, the rubber particles function to absorb the impact. Accordingly, the dispersion, sizes, and size distribution of the rubber particles affect the mechanical properties of the resin such as impact strength, toughness, surface gloss, and heat resistance.

Although conventional rubber modified HIPS resins are widely used in electrical household goods and office equipments housing, they are inferior to the acrylonitrile-butadiene-styrene (ABS) resin in appearance of the molded articles such as gloss and color. As the molded articles with high gloss are needed in various products including sheets for packing containers, the weakness of the appearance character of HIPS has been an obstacle for expanding the use of the resin.

In general, the smaller the sizes of the rubber particles dispersed in polystyrene are, the better the toughness and surface gloss are, but the worse the impact strength is. However, the larger the sizes of the rubber particles dispersed in polystyrene are, the better the impact strength is, but the worse the toughness and surface gloss are.

Therefore, there has been intensive research to obtain preferable rubber modified HIPS resins. Japanese Patent Laid-open No 4-100810 teaches a method to control the sizes of rubber particles using a rubber polymer having two different cis-contents. The resin of the Japanese patent application shows good impact strength but poor surface gloss.

U.S. Pat. No. 4,839,418 to Schwaben et al discloses a thermoplastic molding material consisting of a hard polystyrene matrix and a soft phase which is distributed in the hard phase and has a particle diameter of less than 0.8 μm. Although the molding material has good gloss, it shows a shortcoming of decreasing impact strength.

U.S. Pat. No. 4,146,589 to Dupre discloses a method for preparing improved monoalkenyl aromatic polyblends having a dispersed rubber phase as rubber particles having a bimodal particle size distribution and compositions thereof. In the patent, two different rubber polymers with different shapes and particle size distributions were used to improve the gloss and impact strength. However, the gloss and impact strength were not satisfactory.

European Patent Publication No. 0 337 569 A1 discloses a high gloss, impact resistant rubber-modified polystyrene composition consisting of a polystyrene and dispersed particles of elastomeric polymers, and optionally polydimethylsiloxane and at least one member selected from the group consisting of mineral oil, metallic salts and amides of higher fatty acids based on the total weight of the composition.

The present inventor has developed a rubber modified polystyrene resin composition with high gloss and impact resistance, which is prepared by polymerizing styrene, polybutadiene rubber and a clay material so as to disperse at least two different sizes of polybutadiene rubber particles in the matrix of polystyrene.

OBJECTS OF THE INVENTION

A feature of the present invention is the provision of a rubber modified polystyrene resin composition with high gloss.

Another feature of the present invention is the provision of a rubber modified polystyrene resin composition with impact resistance.

Other objects and advantages of this invention will be apparent from the ensuing disclosure and appended claims.

SUMMARY OF THE INVENTION

A method for preparing a rubber modified polystyrene resin composition with high gloss and impact resistance is disclosed which comprises: (i) polymerizing a solution of about 80 to 95% by weight of styrene (A) and about 5 to 20% by weight of polybutadiene rubber (B) and a clay material (C) organic-treated with an organic compound wherein the polymerization is conducted at a temperature of about 90 to 150° C. in a first reactor so as to disperse at least two different sizes of polybutadiene rubber particles in a matrix of polystyrene; and (ii) inputting the resulting solution of step (i) to a second reactor being kept at about 130 to 180° C. to terminate the polymerization.

The rubber modified polystyrene resin composition with high gloss and impact resistance according to the present invention is prepared by (i) polymerizing a solution consisting of about 80 to 95% by weight of styrene (A) and about 5 to 20% by weight of polybutadiene rubber (B) with a clay material at a temperature of about 90 to 150° C. in a first reactor so as to disperse at least two different sizes of polybutadiene rubber particles in the matrix of polystyrene, and (ii) inputting the resulting solution of the step (i) to a second reactor being kept at about 130 to 180° C. to terminate the polymerization. The starting materials for polymerization are described in detail as follow.

DETAILED DESCRIPTION OF THE INVENTION (A) Styrene Monomer

The base material of the HIPS resin according to the present invention is styrene. And other aromatic monomers can be used in this invention. Specifically, the aromatic monomers include styrene; alkyl substituted styrenes such as α-ethyl styrene and α-methyl styrene; alkyl substituted styrenes such as vinyl toluene, vinyl xylene, o-t-butyl styrene, p-t-butyl styrene and p-methyl styrene; halogenated styrenes such as monochlorostyrene, dichlorostyrene and tribromostyrene, tetrahydrostyrene; p-hydroxy styrene; and o-methoxy styrene. The aromatic styrene can be used in single or in combination of at least two components. Styrene, a mixture of styrene and acrylonitrile, and α-methyl styrene may be preferably used.

(B) Butadiene-base Rubber Polymer

The representative examples of butadiene-base rubber polymer include polybutadiene homopolymer, butadiene-styrene copolymer, polyisoprene polymer, and butadiene-acrylonitrile copolymer. Polybutadiene homopolymer may be preferably used.

There are various butadiene-base rubber polymers depending on cis-contents, Mooney viscosity, viscosity at 25° C. in 95% styrene solution, which are preferably employed in this invention.

The rubber particles average size in the rubber modified polystyrene resin is preferably in the range of about 0.1 to 6.0 µm. If the particles average size is smaller than 0.1 µm, the impact strength decreases severely, and if the particles average size is larger than 6.0 µm, all the mechanical properties are not satisfied.

According to the present invention, the rubber particles are dispersed with two different average sizes of about 0.1 to 1.0 µm and about 1.5 to 6.0 µm or with three different average sizes of about 0.1 to 1.0 µm, about 1.0 to 2.0 µm and about 2.0 to 6.0 µm The contents of the different size particles can be controlled on the purpose of the resin.

The rubber polymer is employed in an amount of about 5 to 20% by weight based on the styrene-rubber mixture. If the rubber polymer is used less than 5% by weight, the impact strength decreases severely, and if the rubber polymer is used more than 20% by weight, the viscosity in the first reactor becomes too high to transport the resulting solution to the second reactor and to agitate in the first reactor, which will cause a problem in controlling the particle size.

(C) Clay Material

The clay material according to the present invention is an inorganic additive and functions to convert the large rubber particles to smaller rubber particles. The plate shape clay material that is dispersible at nano size during polymerization of styrene converts some of large polybutadiene rubber particles to smaller rubber particles.

The clay material is a plate shape and has preferably a length and width of about 500 to 1000 Å, a thickness of about 9 to 12 Å and a distance between the plates of about 10 Å. The clay material is agglomerated with plates.

A preferable clay material is smectite that includes montmorillonite, saponite and hectorite. These clay materials are used in single and in a mixture of at least two components.

The preferable clay material usable in this invention is a plate type clay mineral having a cation exchange capacity of about 50 to 200 milliequivanlents per 100 grams. The cation exchange capacity can be obtained by organic treatment of the clay. The organic treatment is carried out by ion exchange reaction with onium ions such as ammonium ion. For organic treatment of the clay, dimethyl dihydrogenated tallow alkyl ammonium chloride, dimethyl hydrogenated tallow alkyl benzyl ammonium chloride, dimethyl 2-ethylhexyl hydrogenated tallow alkyl ammonium chloride, dimethyl diethoxymethyl hydrogenated tallow alkyl ammonium chloride, trimethyl hydrogenated tallow alkyl ammonium chloride, and stearyl bis(2-hydroxyethyl)methyl ammonium chloride can be used in single or in a mixture of at least two components.

The organic compounds exist between plates of the clay through organic treatment, and the distances of the plates become lager. If the clay material with no organic treatment is used, the bonding force between polystyrene and clay is weak because there is no compatibility between them. Furthermore, as the clay exists like an agglomerated shape in the polymer matrix, the reinforcing effect is poor, in particular, the impact strength is severely decreased.

The organic treated clay material is used in an amount of about 0.01 to 20 parts by weight per 100 parts by weight of the solution of the starting materials, styrene monomer and butadiene-base rubber polymer. If the clay material is used less than 0.01 parts by weight, it does not produce a sufficient amount of smaller rubber particles to give a poor surface gloss. If the clay material is used more than 20 parts by weight, the amount of the large rubber particles decreases to result in poor impact strength.

The organic treated clay material can be added to the first reactor with other starting material before polymerization, or to the second reactor, or to the both reactors. When the clay material is added to the second reactor, the rubber component dissolved in the styrene matrix should be converted to a dispersed particle phase.

(D) Other Additives

The initiators for polymerization usable in this invention are organic peroxides and azo compounds. The representative examples are benzoyl peroxide, t-butyl perbenzoate, t-butyl peracetate, azobisisobutylonitrile, percarbonate, and azobis-2-methylbutylonitrile. These initiators may be used in single or in a mixture of at least two initiators.

If necessary, a molecular weight controlling agent may be used for controlling molecular weight of the styrene polymer. The examples are t-dodecylmercaptan and n-dodecylmercaptan.

To improve processability and scratch resistance as well as gloss and impact resistance of the HIPS resin, polydimethyl siloxane and/or mineral oil such as paraffin wax can be added, which is easily carried out by an ordinary skilled person in the art.

It is preferable to use polydimethyl siloxane with a lower viscosity of about 100 to 10,000 cps at 25° C. Also it is preferable to use polydimethyl siloxane up to 0.2% by weight not to cause a decrease of heat resistance.

The mineral oil such as paraffin wax is used in an amount of about 0.5 to 5.0% by weight. If the amount is over 5.0%, heat resistance and appearance character of the molded articles are deteriorated. The polydimethyl siloxane and/or mineral oil such as paraffin wax can be added during dissolution of rubber component at the first reactor or, can be continuously added to the second reactor.

In the present invention, a higher gloss can be obtained by using glyceride from soybean. It is preferable to use the glyceride in an amount of about 0.001 to 0.2% by weight to provide excellent stability and uniformity of the rubber particles in the final polystyrene resin. If the glyceride is used less than 0.001% by weight, no effect is obtained, and if the glyceride is used more than 0.2% by weight, excessive plastization occurs to result in a decrease of heat resistance and gloss. It is preferable to add the glyceride to the first reactor for its effectiveness.

The rubber modified polystyrene resin composition with high gloss and impact resistance according to the present invention is prepared by a first step (i) polymerizing a solution consisting of about 80 to 95% by weight of styrene (A) and about 5 to 20% by weight of polybutadiene rubber (B) with a clay material (C) at a temperature of about 90 to 150° C. in a first reactor so as to disperse at least two different sizes of polybutadiene rubber particles in the matrix of polystyrene, and a second step (ii) inputting the resulting solution of the step (i) to a second reactor being kept at about 130 to 180° C. to terminate the polymerization.

The rubber modified polystyrene resin composition with high gloss and impact resistance according to the present invention can be prepared through a conventional polymerization process such as emulsion, suspension, or continuous bulk process. However, the copolymer can be preferably prepared through the continuous bulk process. The method for preparing the rubber modified polystyrene resin composition with high gloss and impact resistance according to the present invention will be described in detail as follow.

(1) First Step

The butadiene-base rubber polymer it dissolved in styrene monomer at 50° C. for about 1 to 3 hours through agitation. Other additives are added to the reactor to dissolve therein. The clay material is sufficiently dissolved in styrene monomer. The styrene-butadiene rubber solution and clay material are preheated at about 70 to 90° C., and then added to the first reactor.

The first reactor is heated at about 90 to 150° C., and styrene monomers are converted to styrene polymer whose conversion is about 20 to 40%.

The agitator is an anchor type and has an speed of about 10 to 60 rpm. A molecular weight controlling agent of mercaptans can be added to the first reactor, and an initiator can be used for effectiveness of polymerization.

In this first step, the continuous phase of polybutadiene rubber are converted to dispersed rubber particles.

(2) Second Step

The resulting solution in the first reactor is continuously transported to the second reactor in which polymerization terminates at about 130 to 180° C. The plate shape clay material that is dispersible at nano size during polymerization of styrene converts some of large polybutadiene rubber particles to smaller rubber particles. The rubber particles are dispersed with two different average sizes of about 0.1 to 1.0 μm and about 1.5 to 6.0 μm or with three different average sizes of about 0.1 to 1.0 μm, about 1.0 to 2.0 μm and about 2.0 to 6.0 μm The polystyrene resin composition with dispersed polybutadiene rubber particles shows high gloss and good impact resistance. The contents of the different size particles can be controlled on the purpose of the resin.

For particular properties of the resin composition, an antioxidant, a lubricant, and/or a releasing agent can be added to the second reactor.

The second reactor can be installed with multiple reactors for certain purposes. Unreacted monomers are removed at a high temperature of about 200 to 240° C. from the resulting polymer of the second reactor. The final polymer is cut into pellets.

The invention may be better understood by reference to the following examples which are intended for the purpose of illustration and are not to be construed as in any way limiting the scope of the present invention, which is defined in the claims appended hereto. In the following examples, all parts and percentage are by weight unless otherwise indicated.

EXAMPLE 1

Polybutadiene rubber of 8 parts by weight and some portion of styrene monomer of 92 parts were Mixed and agitated at 50° C. over 3 hours. The clay material ($C_1$) was organic-treated with dimethyl dihydrogenated tallow alkyl ammonium chloride. The organic treated clay of 1 part by weight was dissolved in the remaining portion of styrene monomer of 92 parts, and preheated with the polybutadiene rubber solution at 90° C., and added to the anchor type first reactor continuously. The first reactor was kept at 130° C. and polymer conversion was about 30% The resulting polymer was transported to a second reactor at 170° C., and to the reactor were additives for reinforcing impact strength added. The additives were 2.0% by weight of paraffin wax and 0.1% by weight of stearic acid zinc salt.

The conversion at the second reactor was about 72%, a final polymer was obtained after removing unreacted monomers. The average particles size, gloss, Izod impact strength, and softening temperature were measured and are shown in Table 1.

EXAMPLE 2

Example 2 was conducted in the same manner as in Example 1 except that 2 parts by weight of clay material ($C_1$) treated with dimethyl dihydrogenated tallow alkyl ammonium chloride was used, t-butylperacetate of 0.03% by weight was used as an initiator in the first reactor, and the first reactor was kept at 115° C. The mechanical properties of obtained final polymer are shown in Table 1.

EXAMPLE 3

Example 3 was conducted in the same manner as in Example 1 except that polybutadiene rubber of 10 parts by weight was used, 1 part by weight of clay material ($C_2$) treated with dimethyl hydrogenated tallow alkyl benzyl ammonium chloride was used, t-butylperacetate of 0.05% by weight was used as an initiator in the first reactor, and the first reactor was kept at 115° C. The mechanical properties of obtained final polymer are shown in Table 1.

EXAMPLE 4

Example 4 was conducted in the same manner as in Example 1 except that polybutadiene rubber of 10 parts by weight was used, 2 parts by weight of clay material ($C_2$) treated with dimethyl hydrogenated tallow alkyl benzyl ammonium chloride was used, t-butylperacetate of 0.03% by weight was used as an initiator in the first reactor, and the first reactor was kept at 115° C. The mechanical properties of obtained final polymer are shown in Table 1.

COMPARATIVE EXAMPLE 1

Comparative Example 1 was conducted in the same manner as in Example 1 except that a clay material was not used. The mechanical properties of obtained final polymer are shown in Table 1.

COMPARATIVE EXAMPLE 2

Comparative Example 2 was conducted in the same manner as in Example 1 except that polybutadiene rubber of 10 parts by weight was used, 2 parts by weight of clay material ($C_3$) with no organic treatment was used, and t-butylperacetate of 0.05% by weight was used as an initiator in the first reactor. The mechanical properties of obtained final polymer are shown in Table 1.

The mechanical properties were measured as follow:

(1) The Izod impact strength was measured in accordance with ASTM D256(⅛" notch).

(2) The gloss was measured was measured in accordance with ASTM D526(60°).

(3) The softening temperature was measured in accordance with ASTM D1525(5 kg).

(4) The rubber particles size was measured with a Transmission Electron Microscopy (TEM) with 5,000 to 10,000 times. The particles sizes are classified into the following three. Each average particle size was measured. The fractions were calculated by the volume of each average particle times the number of particles.

Large particle rubber (I): average particle size 2.0 to 6.0 μm
Medium particle rubber (II): average particle size 1.0 to 2.0 μm
Small particle rubber (III): average particle size 0.1 to 1.0 μm

TABLE 1

|  | Examples | | | | Comp. Examples | |
| --- | --- | --- | --- | --- | --- | --- |
|  | 1 | 2 | 3 | 4 | 1 | 2 |
| (A) styrene monomer | 92 | 92 | 90 | 90 | 92 | 90 |
| (B) polybutadiene | 8 | 8 | 10 | 10 | 8 | 10 |
| (C) clay material |  |  |  |  |  |  |
| (C$_1$) | 1 | 2 | — | — | — | — |
| (C$_2$) | — | — | 1 | 2 | — | — |
| (C$_3$) | — | — | — | — | — | 2 |
| (D) t-butyl peracetate | — | 0.03 | 0.05 | 0.03 | — | 0.05 |
| temp (° C.) at first reactor | 130 | 115 | 115 | 130 | 130 | 130 |
| rubber particle distribution (%) |  |  |  |  |  |  |
| Large (I) | 52 | 63 | 50 | 49 | 100 | 100 |
| Medium (II) | 37 | — | 25 | 11 | — | — |
| Small (III) | 11 | 37 | 25 | 40 | — | — |
| Izod impact strength (kg · cm/cm) | 15.7 | 18.0 | 18.7 | 19.2 | 12 | 9.5 |
| gloss (%) | 93 | 96 | 96 | 98 | 52 | 45 |
| softening temp (° C.) | 90 | 92 | 89 | 92 | 84 | 81 |

As shown in Table 1, the resin composition of Comparative Example 1 that does not employ a clay material shows poor impact strength, gloss and softening temperature, and the resin composition of Comparative Example 2 that does employ a clay material with no organic treatment shows poorer impact strength, gloss and softening temperature than the resin composition of Comparative Example 1.

The present invention can be easily carried out by an ordinary skilled person in the art. Many modifications and changes may be deemed to be with the scope of the present invention as defined in the following claims.

What is claimed is:

1. A method for preparing a rubber modified polystyrene resin composition, which comprises:
   (i) polymerizing a solution of about 80 to 95% by weight of styrene (A) and about 5 to 20% by weight of polybutadiene rubber (B) and a clay material (C) organic-treated with an organic compound wherein the polymerization is conducted at a temperature of about 90 to 150° C. in a first reactor; and
   (ii) inputting the resulting solution of step (i) to a second reactor being kept at about 130 to 180° C. to terminate the polymerization
   wherein said organic-treated clay material functions to convert said polybutadiene rubber into polybutadiene rubber having at least two different particle sizes dispersed in a matrix of polystyrene.

2. The method for preparing a rubber modified polystyrene resin composition as defined in claim 1, wherein said polybutadiene rubber particles are dispersed with two different average sizes of about 0.1 to 1.0 μm and about 1.5 to 6.0 μm.

3. The method for preparing a rubber modified polystyrene resin composition as defined in claim 1, wherein said polybutadiene rubber particles are dispersed with three different average sizes of about 0.1 to 1.0 μm, about 1.0 to 2.0 μm and about 2.0 to 6.0 μm.

4. The method for preparing a rubber modified polystyrene resin composition as defined in claim 1, wherein said organic compound for organic treatment of clay is dimethyl dihydrogenated tallow alkyl ammonium chloride, dimethyl hydrogenated tallow alkyl benzyl ammonium chloride, dimethyl 2-ethylhexyl hydrogenated tallow alkyl ammonium chloride, dimethyl diethoxymethyl hydrogenated tallow alkyl ammonium chloride, trimethyl hydrogenated tallow alkyl ammonium chloride, or stearyl bis(2-hydroxyethyl)methyl ammonium chloride.

5. The method for preparing a rubber modified polystyrene resin composition as defined in claim 1, wherein said clay material is a plate shape and has a length and width of about 500 to 1000 Å, a thickness of about 9 to 12 Å A and a distance between the plates of about 10 Å.

6. The method for preparing a rubber modified polystyrene resin composition as defined in claim 1, wherein said clay material is used in an amount of about 0.01 to 20 parts by weight per 100 parts by weight of the solution of the starting materials, styrene monomer and butadiene rubber polymer.

7. The method for preparing a rubber modified polystyrene resin composition as defined in claim 1, wherein said polystyrene has a conversion rate of about 20 to 40% in step (i).

8. The method for preparing a rubber modified polystyrene resin composition as defined in claim 1, wherein said clay material is montmorillonite, saponite or hectorite.

9. A rubber modified polystyrene resin composition prepared by the method of claim 1.

10. A method for preparing a rubber modified styrene resin composition which comprises:
    (i) polymerizing a solution of about 80 to 95% by weight of styrene monomer (A) and about 5 to 20% by weight of diene rubber (B) and a clay material (C) organic-treated with an organic compound wherein the polymerization is conducted at a temperature of about 90 to 150° C. in a first reactor; and
    (ii) inputting the resulting solution of step (i) to a second reactor being kept at about 130 to 180° C. to terminate the polymerization
    wherein said organic-treated clay material functions to convert said diene rubber into diene rubber having at least two different particle sizes in a matrix of styrene resin.

11. The method according to claim 10, wherein the converted diene rubber is comprised of particles have two different average sizes of about 0.1 to 1.0 μm and about 1.5 to 6.0 μm.

12. The method according to claim 10, wherein the converted diene rubber is comprised of particles have three different average sizes of about 0.1 to 1.0 μm, about 1.0 to 2.0 μm and about 2.0 to 6.0 μm.

13. The method according to claim 10, wherein the styrene monomer is styrene, alpha-ethyl styrene, alpha-methyl styrene, vinyl toluene, vinyl xylene, o-t-butyl styrene, p-t-butyl styrene and p-methyl styrene, monochlorostyrene, dichlorostyrene, tribromostyrene, tetrahydrostyrene, p-hydroxy styrene, o-methoxy styrene or a mixture thereof.

14. The method according to claim 13, wherein the styrene monomer is styrene or alpha-methyl styrene.

15. The method according to claim 10, wherein the diene rubber is polybutadiene homopolymer, butadiene-styrene copolymer, polyisoprene polymer, or butadiene-acrylonitrile copolymer.

16. The method according to claim 15, wherein the diene rubber is polybutadiene homopolymer.

17. The method according to claim 10, wherein said organic compound for organic treatment of clay is dimethyl dihydrogenated tallow alkyl ammonium chloride, dimethyl hydrogenated tallow alkyl benzyl ammonium chloride, dimethyl 2-ethylhexyl hydrogenated tallow alkyl ammonium chloride, dimethyl diethoxymethyl hydrogenated tallow alkyl ammonium chloride, trimethyl hydrogenated tallow alkyl animonium chloride, or stearyl bis(2-hydroxyethyl)methyl ammonium chloride.

18. The method according to claim 10, wherein said clay material is a plate shape and has a length and width of about 500 to 1000 Å, a thickness of about 9 to 12 Å and a distance between the plates of about 10 Å.

19. The method according to claim 10, wherein said clay material is used in an amount of about 0.01 to 20 parts by weight per 100 parts by weight of the solution of the starting materials, styrene monomer and diene rubber polymer.

20. The method according to claim 10, wherein said styrene resin has a conversion rate of about 20 to 40% in step (i).

21. The method according to claim 10, wherein said clay material is montmorillonite, saponite or hectorite.

22. The method according to claim 10, wherein the solution of step (i) contains acrylonitrile monomer.

23. A rubber modified polystyrene resin composition prepared by the method of claim 10.

24. A method for preparing a rubber modified styrene resin composition which comprises:
 (i) polymerizing a solution of about 80 to 95% by weight of styrene monomer (A) and about 5 to 20% by weight of diene rubber (B) and a clay material (C) treated with at least one quaternary ammonium compound wherein the polymerization is conducted at a temperature of about 90 to 150° C. in a first reactor; and
 (ii) inputting the resulting solution of step (i) to a second reactor being kept at about 130 to 180° C. to terminate the polymerization,
 wherein said treated clay material functions to convert said diene rubber into diene rubber having at least two different particle sizes in a matrix of styrene resin.

* * * * *